United States Patent Office 2,756,184
Patented July 24, 1956

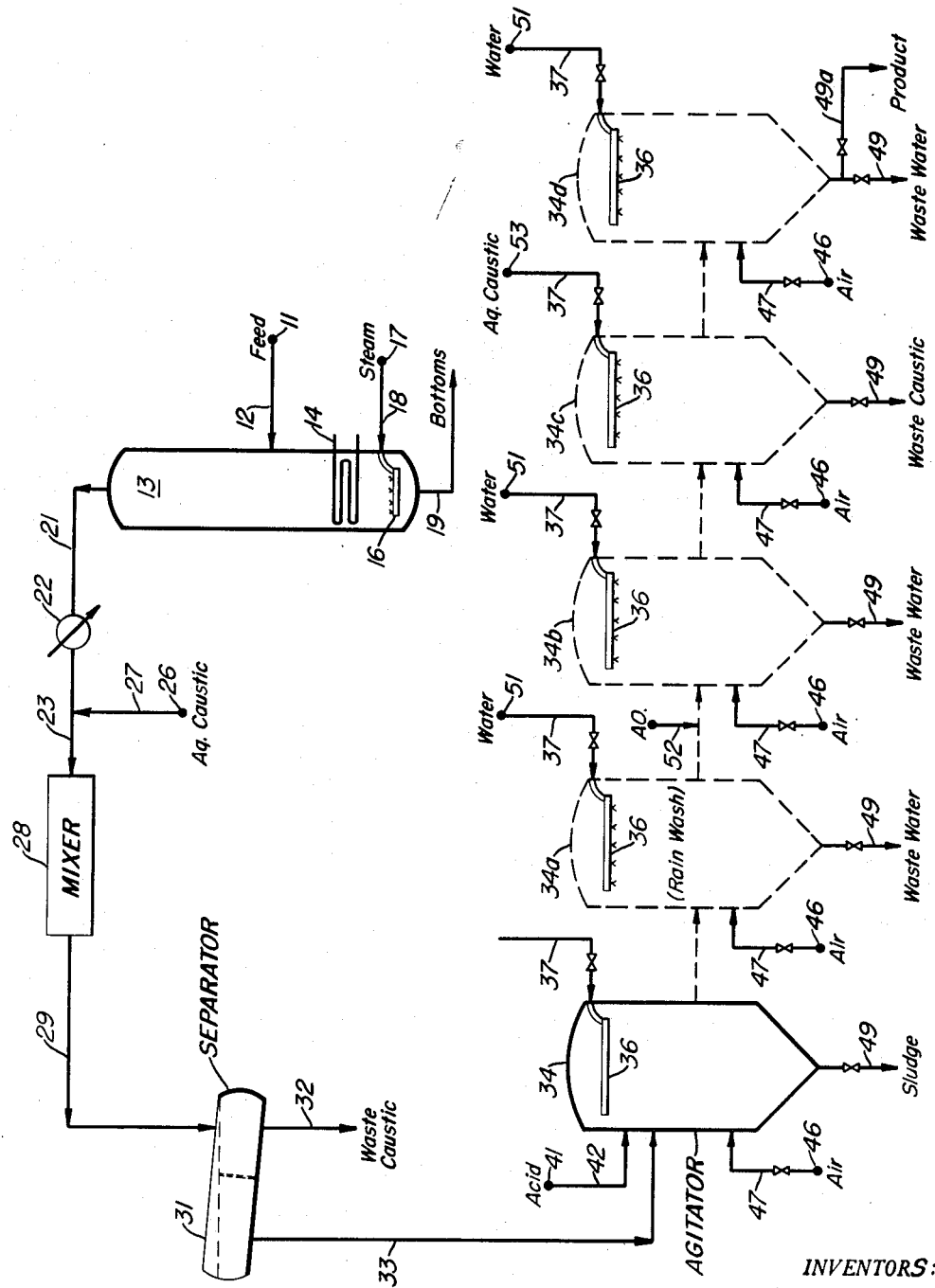

2,756,184

PROCESS FOR PREPARING ODORLESS MINERAL SPIRITS BY TREATING WITH ACID FOLLOWED BY AN OXIDATION INHIBITOR AND THEN ALKALI

Allen E. Brehm and Theodore B. Tom, Griffith, Ind., assignors to Standard Oil Company, Chicago, Ill., a corporation of Indiana Application April 21, 1954, Serial No. 424,709

11 Claims. (Cl. 196—38)

This is a continuation-in-part of our co-pending application, Serial No. 349,892, filed April 20, 1953.

This invention relates to odorless mineral spirits. More particularly the invention relates to solvent naphthas such as painters' naphtha, which naphthas must have a minimum of the so-called naphtha odor.

Petroleum naphthas have been used for many years in the paint and varnish industry as solvents. More recently petroleum naphthas are being used in the synthetic resin industry as solvents. The primary objection to the use of petroleum naphthas in these fields has been the odor of the naphtha. Naphthas that are essentially free of sulfur compounds still possess a characteristic paraffin odor. Continuous efforts have been made by the petroleum industry toward the production of a so-called odorless mineral spirit for use as a solvent in the paint, varnish and resin trades.

An object of the invention is the production of an essentially odorless and non-corrosive mineral spirit suitable for use in the paint, varnish and resin trades. Another object is the preparation of an odorless and non-corrosive naphtha derived from pertoleum hydrocarbons. A particular object is an odorless mineral spirit derived from a synthetic mixture of paraffinic hydrocarbons derived from petroleum conversion processes. A specific object is the production of an odorless and non-corrosive naphtha by acid refining of a fraction boiling between about 325° and 425° F. that has been derived from the acid-catalyzed alkylation of butenes and isobutane. Other objects will become apparent in the course of the detailed description of the invention.

Mineral spirits having an odor-quality suitable for use as a solvent particularly in the paint, varnish and resin trades, are produced by a process comprising (1) treating a feed naphtha boiling between about 325° and 425° F. that has been derived from hydrocarbons containing from 3 to 5 carbon atoms, which feed is characterized by being essentially free of olefins and aromatic hydrocarbons and elemental sulfur, with an effective amount of sulfuric acid having a concentration of between about 90 and 100 weight percent, (2) separating acid sludge from treated naphtha, (3) rain-washing said treated naphtha with liquid water to remove substantially all of the occluded-acid sludge particles therefrom, (4) separating rain-wash water from rain-washed naphtha, (5) intimately contacting said naphtha from step (4) with liquid water, (6) separating water from washed naphtha, (7) contacting said washed naphtha with an aqueous alkaline solution to essentially neutralize said washed naphtha, (8) separating aqueous alkaline solution from an essentially neutral naphtha, (9) water washing said neutralized naphtha and (10) removing occluded aqueous alkaline solution from said neutralized naphtha, wherein to the rain-washed naphtha of step 4 there is added an effective amount of an oil soluble aqueous-caustic insoluble oxidation inhibitor selected from the class of phenylene diamines and polyalkylphenols prior to the water washing of step 5. Preferably, the oxidation inhibitor is added in an amount between about 6 and 10 lbs. per 1000 bbls. (42 gal.) of naphtha.

The feed to the process of this invention is composed essentially of a mixture of paraffinic and isoparaffinic hydrocarbons, i. e., is essentially free of olefins and aromatic hydrocarbons. Very small amounts of organic sulfur compounds may be present. The feed must be essentially free of hydrogen sulfide and elemental sulfur.

The most suitable feed to the process is derived from hydrocarbons containing from 3 to 5 carbon atoms, which hydrocarbons have interacted to produce a mixture of essentiallly paraffinic and isoparaffinic hydrocarbons of the proper boiling range for the desired solvent naphtha. In general the solvent naphtha should boil between about 325° and 425° F. and preferably between about 350° and 400° F. A lower boiling point may be acceptable for some uses.

The mixture of hydrocarbons that are a suitable source for the feed to the process is derived by alkylation of an olefin containing from 3 to 5 carbon atoms with an isoparaffin containing from 4 to 5 carbon atoms, i. e., the feed naphtha may be derived from the product of an alkylation reaction between an olefin selected from the class consisting of propene, butenes and pentenes and an isoparaffin selected from the class consisting of isobutane and isopentane.

Another suitable source of feed naphtha to the process is a mixture of hydrocarbons obtained by the polymerization of olefins containing from 3 to 5 carbon atoms and the hydrogenation of the polymeric materials to form a mixture of essentially paraffinic and isoparaffinic hydrocarbons, i. e., the feed naphtha may be derived from the hydrogenated product of the polymerization of an olefin selected from the class consisting of propenes, butenes and pentenes.

Many processes are known for the preparation of materials of the type described above. For example, a suitable source of feed naphtha is the total alkylate derived from the acid-catalyzed alkylation of butenes and isobutane, which reactants have been obtained from petroleum refining operations. Typical acid catalysts are liquid hydrogen fluoride and sulfuric acid. Another example of a process for the preparation of a suitable feed is the hydrocodimer derived from the polymerization of a refinery propene and butene stream over a supported phosphoric acid catalyst to form a broad boiling range unsaturated liquid product; this unsaturated product is hydrogenated in the presence of a catalyst to produce an essentially saturated broad boiling product commonly known as hydrocodimer.

The preferred feed to the process of this invention is derived from the heavy alkylate fraction of a cold-acid alkylation process utilizing petroleum refinery butenes and isobutane as the feed to the alkylation reaction. This material is essentially free of olefins and contains only a very minor amount of organic sulfur compounds.

The detailed description of the process of this invention is made in conjunction with the annexed drawing, which drawing forms a part of this specification. The drawing shows in schematic and figurative form a preferred method of carrying out the process. Many details of equipment have been omitted as these may be readily supplied by those skilled in this art.

In the drawing a heavy alkylate derived from the sulfuric acid alkylation of refinery butenes and isobutane which boils between about 325° and 600° F. is passed from source 11 by way of line 12 into fractionator 13. Fractionator 13 is provided with an internal heat exchanger 14 and with a stripping medium distributor 16. In this embodiment fractionator 13 is operated with the use of steam stripping; steam from source 17 is passed by way of line 18 into distributor means 16, which means 16 is positioned near the bottom of fractionator 13. Instead of using a stripping medium such as steam, comparable results can be obtained by operating fractionator 13 under vacuum. A high boiling bottoms fraction is withdrawn from fractionator 13 and is passed to storage not shown by way of line 19.

An overhead fraction having a maximum ASTM boiling point of about 400° F. is withdrawn along with steam by way of line 21. The overhead naphtha and steam are condensed by means of heat exchanger 22 and the condensate is passed into line 23.

It has been found that the presence of elemental sulfur in the naphtha feed to the acid treating step of the process has an extremely deleterious effect on the quality of the solvent naphtha. Solvent naphtha is required to be substantially non-corrosive to the copper strip test. The organic sulfur compounds normally present in the alkylate decompose to some extent in the distillation step to produce hydrogen sulfide. This hydrogen sulfide is oxidized by free-oxygen on exposure to the atmosphere, e. g., in a storage tank, to form elemental sulfur. In general the $H_2S$ containing naphtha may be exposed to free-oxygen for as much as four hours before deleterious amounts of elemental sulfur are formed. In order to eliminate the formation of elemental sulfur the $H_2S$ present in the naphtha in line 23 is neutralized by the injection of aqueous caustic solution from source 26 and line 27. Herein a 10 weight percent aqueous NaOH solution is used.

The combined stream of naphtha, condensed steam and aqueous caustic solution is passed into mixer 28 wherein intimate contacting takes place. Mixer 28 may be any form of apparatus provided for intimate contacting such as knothole mixer or a tank provided with a stirrer. From mixer 28 the mixture is passed by way of line 29 into separator 31. From separator 31 the lower aqueous phase is passed by way of line 32 to waste caustic disposal.

Feed naphtha essentially free of $H_2S$ and elemental sulfur is withdrawn by separator 31 and is passed by way of line 33 into agitator 34. Agitator 34 is a cone-bottomed contacting vessel, provided with a roof, of the type widely used in the petroleum industry. Agitator 34 is provided with various lines for introducing liquid and gaseous materials into the vessel and also means for withdrawing materials from the tip of the cone. In this particular agitator a distributor means 36 and valved line 37 are provided near the top of the vessel.

For clarity of presentation the process is depicted in the drawing as taking place in a plurality of agitators 34a, 34b, 34c and 34d. These alphabetically designated agitators are shown by means of broken lines. This has been done in order to indicate that agitators 34a—34d do not actually exist in the process. The entire processing of the feed naphtha from line 33 actually occurs in a single agitator 34. For clarity each distinctly different individual operation has been presented as though it occurred in a different agitator.

Returning to the first step in the process proper, feed naphtha from line 33 is introduced into agitator 34 until the desired amount of naphtha is present. Sulfuric acid from source 41 is passed by way of line 42 into agitator 34. The sulfuric acid must have a concentration between about 90 and 100 weight percent and must be used in at least an effective amount to produce the desired odorless naphtha product. Excessive usage of sulfuric acid should be avoided. In general between about 5 and 25 lbs. of sulfuric acid should be used per barrel of feed naphtha. In order to produce the highest odor-quality solvent naphtha, the sulfuric acid should be either white acid derived from $SO_2$ or the so-called black acid derived from the processing of refinery waste acids and acid sludges. It is preferred to use sulfuric acid having a concentration between about 96 and 100 weight percent. The amount of acid used will vary with the type of feed naphtha charged to the process.

In this embodiment 12 lbs. of 96.5% black acid are used per barrel of feed naphtha (herein 42-gallon barrels are meant). The acid and naphtha in agitator 34 are thoroughly agitated by means of compressed air introduced from source 46 by way of valved line 47 into a lower portion of agitator 34. The agitation is continued until it is believed the reaction has been completed.

After the completion of the air agitation the contents of agitator 34 are permitted to settle into an acid sludge phase and a treated naphtha phase. The lower layer of acid sludge is withdrawn by way of valved line 49 and is sent to acid recovery means not shown.

It may be desirable to carry out the acid treating in more than one stage. Thus a portion of the acid may be placed in the agitator with the naphtha, the contacting carried out and acid sludge separated. Then the remainder of the acid may be used to treat the once-treated naphtha. This multiple dump procedure is particularly useful when quite large amounts of acid are being used.

The treated naphtha contains entrained sludge particles as well as dissolved acidic materials. It has been found that the entrained sludge particles, i. e., pepper sludge, readily hydrolyze on contact with water to produce naphtha-soluble materials which impart an undesirable odor to the product naphtha. The pepper sludge is removed from the treated naphtha by means of a rain-wash procedure. In this procedure a gentle drizzle of liquid water, from source 51 and line 37, is provided by distributor 36. This rain causes droplets of water to flow through the pool of treated naphtha without agitating the body of treated naphtha. The droplets wash out of the treated naphtha, the pepper sludge and also wash from the wall of agitator 34 adhering sludge particles. The pool of treated naphtha in the agitator is maintained in a relatively static position except for the gentle rise in level as a lower layer of rain-wash water is formed in the bottom of the agitator. (No agitation air is introduced into agitator 34 during the rain-washing procedure.)

Sufficient rain-wash water must be introduced into the agitator to remove substantially all the occluded-acid sludge particles from the treated naptha. In the case of a well settled treated naphtha, the amount of water may be between about 5 and 100 volume percent based on treated naphtha. Better results are obtained by the used of two rain washes, i. e., the treated naphtha is rain washed once and the rain-wash water withdrawn from the agitator and the rain-washed naphtha is then given a second rain wash followed by withdrawal of rain-wash water from the agitator. When operating with a plurality of rain washes a relatively small amount of water can be used in each wash. The waste water from the rain-washing procedure is withdrawn from the agitator by way of valved line 49.

The rain-washed naphtha which is now substantially free of pepper sludge is inhibited against oxidation by the air used for agitation in the subsequent steps by the introduction of an effective amount of an oxidation inhibitor. The oxidation inhibitor must be oil soluble. In order to avoid loss of the oxidation inhibitor to either the water used in water washing or aqueous caustic used in neutralization, the oxidation inhibitor must be essentially insoluble in water and aqueous caustic. The oxidation inhibitor is selected from a member of the class consisting of phenylene diamines and polyalkylphenols.

The phenylene-diamine type inhibitor may be any one of those commonly used as oxidation inhibitors in petroleum distillates. More particularly, the alkyl substituted amines, for example, N,N'-di-secondary-butyl-para-phenylene diamine. However, it is understood that other phenylene diamine inhibitors may be employed including N,N'-di-alkyl-p-phenylene diamines in which the alkyl groups contain from 1 to about 12 carbon atoms including such compounds as N,N'-di-iso-propyl-p-phenylene diamine, N,N'-di-amyl-p-phenylene diamine, N,N'-di-hexyl-p-phenylene diamine, etc., as well as those in which the alkyl groups are different as, for example, in such compounds as N-propyl-N'-butyl-p-phenylene diamine, N-butyl-N'-amyl-p-phenylene diamine, N-hexyl-N'-octyl-p-phenylene diamine, etc.

The amount of phenylene diamine inhibitor utilized in the process will vary somewhat with the type of raw-naphtha charged and also with the operating conditions. In general the phenylene diamine inhibitor usage will be at least about 4 pounds per 1000 barrels (42 gal.) of raw-naphtha. Amounts as much as 20 pounds or more may be used in some instances. Excessive usage has no harmful effect; however, it is uneconomic. It is preferred to use between about 6 and 10 pounds of phenylene diamine inhibitor per 1000 barrels (42 gal.) of raw-naphtha.

The polyalkylphenol oxidation inhibitor may be any one of the commonly known members of this class which are sufficiently oil soluble and essentially insoluble in water or aqueous caustic. In general these polyalkylphenols contain at least two alkyl groups; at least 7 carbon atoms are present as members of the substituent alkyl groups. Examples of the polyalkylphenols useful in this invention are di-t-butylphenol, di-amylphenol, di-t-butylmethylphenol, di-sec-butylmethylphenol, tri-isopropylphenol, tri-t-butylphenol and tri-t-amylphenol.

The amounts of the polyalkylphenol inhibitor utilized in the process of the invention are, in general, the same as that for the phenylenediamine type inhibitors. That is, between about 4 and about 20 pounds per 1000 barrels (42 gal.) of raw-naphtha and preferably between about 6 and 10 pounds. Herein antioxidant is introduced by way of line 52 into rain-washed naphtha. Seven pounds per 1000 barrels of naphtha of di-t-butyl-para-cresol are utilized in this embodiment.

Liquid water from source 51 is introduced by way of valved line 37 and distributor 36 into the agitator. When the desired amount of water has been introduced into the agitator the naphtha and water are intimately contacted by agitating the contents of the agitator with compressed air from source 46 and valved line 47. Agitation may also be obtained by a motor driven paddle-stirrer or by recirculating the contents of the agitator through a pump. The amount of water used in this conventional water-washing operation should be enough to remove essentially all the pepper sludge and water-soluble acidic materials remaining in the rain-washed naphtha. The amount of water may be between about 5 and 100 volume percent based on naphtha. At the end of the contacting time the contents of the agitator are settled and the lower water layer is withdrawn to waste water disposal by way of line 49.

The washed naphtha contains dissolved acidic materials which must be removed to produce a satisfactory product naphtha. Aqueous caustic solution from source 53 is passed into the agitator by way of line 37 and distributor 36. In this example a 5 weight percent aqueous NaOH solution is used in an amount of about 10 volume percent based on naphtha. The naphtha and aqueous caustic solution are thoroughly intermingled by means of air from source 46 and line 47. When the naphtha is essentially neutralized the contents of the agitator are settled and the lower aqueous layer is withdrawn to waste caustic disposal by way of valved line 49.

It has been found that in some cases even better quality mineral spirits are obtainable by the use of aqueous caustic solution containing water soluble polyhydroxybenzene or alkylphenol oxidation catalysts. In general, these oxidation catalysts are the same as those useful for the promotion of the oxidation of mercaptans to disulfides. Examples of these oxidation promoters are cresol, xylenol, amylphenol, hydroquinone, catechol, pyrogallol, gallic acid, tannic acid and tannin. The aqueous caustic solution should contain between about 1 and 3 weight percent of the oxidation promoter. Under some conditions it is desirable to operate without an oil soluble oxidation inhibitor in the oil and instead use only aqueous caustic solution containing the defined oxidation promoter. However, it is necessary to add to the product mineral spirits an effective amount of an oil soluble oxidation promoter in order to avoid the formation of odor during the course of storage in vented tanks.

The neutralized naphtha contains occluded aqueous caustic solution. This occluded aqueous caustic solution is removed by a conventional water wash. Water from source 51 is passed into the agitator by way of line 37 and distributor 36. Sufficient water must be used to remove the occluded caustic. The water and naphtha are intimately contacted by agiation with air from source 46 and valved line 47. The contents of the agitator are settled and the lower water layer is passed to waste water disposal by way of valved line 49.

Product odorless mineral spirits are withdrawn from the agitator and passed to storage for further treatment by way of valved line 49a.

Normally the slight haze present in the product naphtha disappears in storage. However, this haze can be removed by passing the hazy naphtha through a coalescer filled with fiberglass packing or rock salt granules.

All the various steps described in the above embodiment are normally carried out at the temperature of the water available for the washing operations. Although normally the acid treating is so mild that excessive temperature rise does not occur, with some types of feed and very heavy acid usages, it may be desirable to cool the contents of agitator 34 by means of an internal heat exchanger not shown.

The odor quality of product solvent naphtha is determined by a standardized odor evaluation procedure. In this procedure a solvent naphtha of about ordinary commercial odor quality has been assigned an arbitrary odor value of 100. Other naphthas are compared to this standard naphtha by the following procedure. The unknown naphtha is smelled by each of twelve sensitive and experienced individuals; each member of this odor panel assigns the unknown naphtha a point value as compared to the standard naphtha. The odor-quality of the unknown naphtha is determined as the arithmetical average of the numerical value assigned to the naphtha by the individual members of the panel. It has been found that quite accurate reproducibility is obtainable in this panel odor evaluation and the odor panel can check an unknown naphtha within ±1 unit.

The corrosivity of the product mineral spirits was determined by the Bolt copper strip technique. This method of determining corrosion is described in the August 9, 1947, issue of the Oil and Gas Journal. In general, the technique is very similar to that of the ASTM D–235 method except that a number is assigned to the strip based on a standard. In this method, the number zero is assigned to a perfect strip, i. e., one equal in appearance to the strip prior to having undergone the test. The higher the number assigned to the strip after the test, the more corrosive the oil.

The results obtainable by the process of this invention and by conventional procedures are illustrated below.

In all experimental runs the feed naphtha was derived from a heavy alkylate that had been produced by the sulfuric acid-catalyzed alkylation of a refinery butene-butane stream. The heavy alkylate was steam distilled, taking overhead about 70% of the charge. The overhead fraction contained H2S and was treated with 5% aqueous NaOH solution to neutralize the H2S. Tests indicated that this feed naphtha contained no detectable amounts of elemental sulfur.

The ASTM distillation, API gravity and sulfur content of the heavy alkylate charged to the steam distillation, the feed naphtha which corresponds to about 70% of the heavy alkylate and a product odorless mineral spirits obtained by the treatment of this feed naphtha according to the process of this invention are presented in Table I below:

TABLE I

| ASTM Dist., °F. | Heavy Alkylate | Agitator Feed Naptha | Product Mineral Spirits |
|---|---|---|---|
| Initial | 352 | 340 | 344 |
| 10 | 370 | 352 | 354 |
| 20 | 373 | 356 | 357 |
| 30 | 376 | 358 | 358 |
| 40 | 381 | 361 | 361 |
| 50 | 386 | 362 | 362 |
| 60 | 393 | 366 | 365 |
| 70 | 404 | 369 | 368 |
| 80 | 427 | 372 | 371 |
| 90 | 478 | 377 | 378 |
| Max. | 576 | 403 | 400 |
| °API | 52.2 | 55.1 | 54.9 |
| Wt. Percent Sulfur | .025 | .01 | .01 |

*Test A*

In this run the feed naphtha was treated in one dump with 10 lbs./bbl. of 98% refinery black acid and the acid sludge withdrawn. The treated naphtha was given two rain washes using 50 volume percent of water in each rain wash. The rain-washed naphtha was given a conventional water wash using 5 volume percent of water. The washed naphtha was then neutralized by contacting it with 5 volume percent of an aqueous solution containing 5 weight percent of NaOH. The neutral naphtha was given a final water wash using 5 volume percent of water.

*Test B*

To a sample of mineral spirits produced by the method of Test A di-t-butyl-para-cresol was added, equivalent to 5 lbs. per 1000 bbls. (42 gal.) of the mineral spirits.

*Test C*

In this test a sample of the feed naphtha was sweetened according to the procedure of Test A, except that to the rain-washed naphtha there was added di-t-butyl-para-cresol, equivalent to 5 lbs. per 1000 bbls. (42 gal.) of naphtha prior to completing the treating as described in Test A.

The product mineral spirts from Tests A–C were evaluated by the odor panel and also tested for corrosion to copper by the Bolt technique. The results of these tests are set out in Table II below:

TABLE II

| Mineral Spirits | Odor-Intensity Reading | Copper Strip |
|---|---|---|
| Test A | 80 | 3 |
| Test B | 80 | 1 |
| Test C | 73 | 0 |

The foregoing data show that a superior product is obtained by the process of this invention. Furthermore, these data show that, surprisingly enough, an oil which is substantially free of organic sulfur compounds can have a bad copper strip. It is believed that peroxides formed in the oil during the air blowing or by oxidation carried into the process dissolved in water and aqueous caustic are responisble for this corrosivity to copper. This theory is supported by the improvement in corrosivity by the presence of the oxidation inhibitor in the oil during the test procedure. The data clearly show that superior quality oil is obtainable by introducing and maintaining in the naphtha oil soluble oxidation inhibitor subsequent to the acid treating operation.

Thus having described the invention, what is claimed is:

1. In the process for the production of an odorless mineral spirit which comprises (1) treating a feed naphtha boiling between about 325° and 425° F. that has been derived from hydrocarbons containing from 3 to 5 carbon atoms, which feed is characterized by being essentially free of olefins and aromatic hydrocarbons and elemental sulfur, with between about 5 and 25 lbs./bbl. of free naphtha of sulfuric acid having a concentration of between about 90 and 100 weight percent, (2) separating acid sludge from treated naphtha, (3) rain-washing said treated naphtha with liquid water to remove substantially all of the occluded-acid sludge particles therefrom, (4) separating rain-wash water from rain-washed naphtha, (5) intimately contacting said naphtha from step (4) with liquid water, (6) separating water from washed naphtha, (7) contacting said washed naphtha with an aqueous alkaline solution to essentially neutralize said washed naphtha, (8) separating aqueous alkaline solution from an essentially neutral naphtha, (9) water washing said neutralized naphtha and (10) removing occluded aqueous alkaline solution from said neutralized naphtha, the improvement which comprises introducing into the rain-washed naphtha from step (4) an effective amount of an oil soluble and essentially water and aqueous caustic insoluble oxidation inhibitor from the class consisting of phenylene diamines and polyalkylphenols.

2. The improvement of claim 1 wherein said phenylene diamine inhibitor consists of an N,N'-di-alkyl-p-phenylene diamine, wherein the alkyl groups contain from 1 to 12 carbon atoms per molecule.

3. The improvement of claim 2 wherein said diamine is N,N'-di-secondary-butyl-para-phenylene diamine.

4. The improvement of claim 1 wherein the polyalkylphenol contains a total of at least 7 substitutent carbon atoms.

5. The process of claim 4 wherein said phenol is 2,6-di-t-butyl-4-methylphenol.

6. The process of claim 4 wherein said phenol is tri-t-butylphenol.

7. The process of claim 1 wherein said inhibitor is added in an amount between about 4 and 20 lbs. per 1000 bbls. (42 gal.) of raw-naphtha.

8. In the process for producing an odorless naphtha, which process comprises (a) distilling an alkylate derived from the acid-catalyzed reaction of an olefin selected from the class consisting of propene, butene and pentene with isobutane to produce a feed naphtha distilling between about 325° and 425° F., which feed naphtha is essentially free of elemental sulfur, (b) treating said feed naphtha with between about 5 and 25 lbs. of sulfuric acid having a concentration of between about 96 and 100 weight percent and separating acid sludge from treated naphtha, (c) removing substantially all of the occluded-acid sludge particles from said treated naphtha by gently flowing drops of water through a relatively static pool of said treated naphtha and separating rain-wash water from washed naphtha, (d) intimately contacting said washed naphtha with liquid water and separating an aqueous phase from a naphtha containing essentially only dissolved acidic materials, (e) neutralizing the naphtha from step (d) by contacting said naphtha with an aqueous alkaline solution and separating an aqueous phase from a naphtha phase and (f) removing entrained aqueous alkaline solution from the naphtha phase of step (e), the improvement wherein to the rain-washed naphtha of step (c) there is added between about 4 and about 20 lbs. per 1000 bbls. of raw-naphtha, an oxidation inhibitor selected from the class consisting of N,N'-di-alkyl-para-phenylene diamines containing from 1 to 12 carbon atoms in said alkyl groups and polyalkylphenols containing at least 7 substituent carbon atoms.

9. The process of claim 8 wherein said oxidation inhibitor is added in an amount between about 6 and 10 lbs. per 1000 barrels (42 gal.) of raw-naphtha.

10. The process of claim 8 wherein said inhibitor is N,N'-di-sec-butyl-para-phenylene diamine.

11. The process of claim 8 wherein said inhibitor is 2,6-di-t-butyl-4-methylphenol.

References Cited in the file of this patent

UNITED STATES PATENTS

| | | |
|---|---|---|
| 1,310,164 | Leslie | July 15, 1919 |
| 1,751,862 | Huff | Mar. 25, 1930 |
| 2,397,077 | Alspaugh | Mar. 26, 1946 |
| 2,552,399 | Browder | May 8, 1951 |
| 2,693,442 | Tom et al. | Nov. 2, 1954 |